(12) United States Patent
Carmona et al.

(10) Patent No.: US 7,260,725 B2
(45) Date of Patent: Aug. 21, 2007

(54) VIRUS DETECTION SYSTEM

(75) Inventors: Itshak Carmona, Petach-Tikva (IL); Vitaly Neyman, Netanya (IL); Malivanchuk Taras, Hulon (IL)

(73) Assignee: Computer Associates Think, Inc., Islandia, NY (US)

( * ) Notice: Subject to any disclaimer, the term of this patent is extended or adjusted under 35 U.S.C. 154(b) by 734 days.

(21) Appl. No.: 10/243,229

(22) Filed: Sep. 13, 2002

(65) Prior Publication Data

US 2003/0093682 A1    May 15, 2003

Related U.S. Application Data

(60) Provisional application No. 60/322,347, filed on Sep. 14, 2001.

(51) Int. Cl.
*G06F 12/14* (2006.01)

(52) U.S. Cl. .................. 713/187; 713/189; 726/24

(58) Field of Classification Search ........ 713/188–189, 713/187; 726/24
See application file for complete search history.

(56) References Cited

U.S. PATENT DOCUMENTS

| | | | |
|---|---|---|---|
| 5,442,699 A | | 8/1995 | Arnold et al. |
| 5,485,575 A * | 1/1996 | Chess et al. .................. 714/38 |
| 5,613,002 A * | 3/1997 | Kephart et al. ............... 726/24 |
| 5,696,822 A * | 12/1997 | Nachenberg .................. 726/24 |
| 5,765,030 A * | 6/1998 | Nachenberg et al. .......... 714/33 |
| 5,809,138 A * | 9/1998 | Netiv .......................... 726/23 |
| 5,826,013 A * | 10/1998 | Nachenberg .................. 726/22 |
| 5,854,916 A * | 12/1998 | Nachenberg .................. 703/21 |
| 5,964,889 A * | 10/1999 | Nachenberg .................. 714/25 |
| 5,999,723 A * | 12/1999 | Nachenberg .................. 703/22 |
| 6,016,546 A * | 1/2000 | Kephart et al. ............... 726/24 |
| 6,052,780 A * | 4/2000 | Glover ......................... 713/193 |
| 6,067,410 A * | 5/2000 | Nachenberg .................. 703/28 |
| 6,081,894 A * | 6/2000 | Mann .......................... 713/188 |
| 6,185,686 B1 * | 2/2001 | Glover ......................... 713/190 |
| 6,357,008 B1 * | 3/2002 | Nachenberg .................. 726/24 |
| 6,393,568 B1 * | 5/2002 | Ranger et al. ................ 713/188 |
| 6,851,057 B1 * | 2/2005 | Nachenberg .................. 726/24 |
| 6,971,019 B1 * | 11/2005 | Nachenberg ................. 713/188 |
| 6,980,992 B1 * | 12/2005 | Hursey et al. ............... 707/102 |
| 6,981,141 B1 * | 12/2005 | Mahne et al. ................ 713/165 |

OTHER PUBLICATIONS

Conan Doyle "The Dancing Men", The Return of Sherlock Holmes, p. 16, Oct. 27, 2003.

(Continued)

*Primary Examiner*—Nasser Moazzami
*Assistant Examiner*—David Garcia Cervetti
(74) *Attorney, Agent, or Firm*—Baker Botts L.L.P.

(57) ABSTRACT

A method of curing an encrypted computer virus present in a computer system includes analyzing encrypted data to determine at least one most frequently occurring encrypted byte in the encrypted data, calculating an encryption key based on the most frequently occurring encrypted byte and a corresponding expected original byte of original data and decrypting the encrypted data using the encryption key to restore the encrypted data to original data.

21 Claims, 5 Drawing Sheets

OTHER PUBLICATIONS

C.S. Nachenberg, "A New Technique for Detecting Polymorphic Computer Viruses. A Thesis Submitted in Partial Satisfaction of the Requirements for the Degree Master of Science in Computer Science and Engineering", Thesis University of California, 1995, pp. I-V, 1-127.

A. Menezes, P. Van Oorschot and S. Vanstone, "Handbook of Applied Cryptography", 1997, pp. 245-249.

Army, Dept. of the; *Monoalphabetic Unilateral Substitution Systems Using Standard Cipher Alphabets*; Field Manual, No. 34-40-2 Hdqtrs; Washington, DC; pp. 3-1-3-10 (Basic Cryptanalysis—pp. 2); Sep. 13, 1990.

* cited by examiner

VIRUS DETECTION SYSTEM

REFERENCE TO RELATED APPLICATION

The present application claims the benefit of Provisional Application Ser. No. 60/322,347 filed Sep. 14, 2001, the entire contents of which are herein incorporated by reference.

BACKGROUND

1. Field of the Disclosure

The present disclosure relates to an antivirus system and, more specifically, to a virus removal system.

2. Brief Description of the Related Art

Computer viruses are a major problem in modern day computing. For example, a computer virus may be a program (or some unit of code, e.g., instructions to which the computer responds, such as a code block, code element or code segment) that may attach to other programs and/or objects, may replicate itself, and/or may perform unsolicited or malicious actions on a computer system. Although described herein as relating to computer viruses, the present disclosure may be applied to any type of malicious code capable of modifying one or more portions of a computer's resources.

Antivirus systems preferably find or detect viruses and then cure the affected file, memory, boot sector, etc. One of the techniques viruses use to complicate their detection and cure is to encrypt parts of the virus body or the file that is going to be infected so that it is harder for an antivirus system to decrypt it and cure the file. This makes it more difficult for the antivirus system to detect and reverse the infection process to cure the file.

The encryption performed by some viruses may involve complex mathematical or logical operations that are performed on the virus code or victim file data that lead to visually unreadable virus code so that it is difficult and sometimes impossible to analyze and identify the viral code inside.

In addition, since encryption can rely on some numerical key that can change from one infected sample to another, pattern matching may not be sufficient to identify the virus body. The antivirus engine should be capable of decrypting the virus first before it can match it against a database of known viruses or otherwise analyze it.

In order to perform its intended purpose, the virus itself should be capable of decrypting encrypted areas of code or data so that it can use it. An antivirus system can sometimes analyze the part of virus code that is responsible for the decryption. The antivirus system can then use the same decryption algorithm that the virus itself uses to decrypt encrypted areas so that the antivirus system can continue to analyze the virus file further. This can sometimes be done by emulating the virus body in a very safe environment that does not allow any malicious actions the virus may take to be executed on a real computer, but only on "virtual machine" that is imitated, for example, by the antivirus system.

Encryption techniques use a key that is used to transform original code or data to an unreadable, encrypted state. The key is usually some integer or real number, but can also be some string of characters. The key is used to encrypt data and may be used by the virus to decrypt the encrypted data, otherwise the data would be useless to the virus.

New types of destructive viruses are constantly emerging. For example, a virus referred to as Win32/Magistr.B.Worm has emerged. This virus although relatively easily detected, can be difficult to remove. This type of virus encrypts part of the host file's entry-point code. For this type of virus to be effectively removed and for the code to be restored, a decryption of this code should take place. However, with this type of virus, the key for the encryption is not stored inside the virus body like some viruses do. Instead, the encryption key for this type of virus is calculated using the machine's name in the Windows operating system. When copying an infected file to another machine, it is very difficult to retrieve that key and to decrypt the code when the infected machines name is unknown.

Accordingly, viruses such as the Win32/Magistr.B virus, for example, use encryption techniques in different ways. Along with encrypting the body of the virus itself, to complicate detection, the virus also encrypts part of the original file to complicate a cure, possibly using the computer name as the key. An antivirus system should be capable of decrypting that part of the original file to completely restore the file to its pre-infected state.

More specifically, as mentioned above, viruses sometimes store the key used to encrypt the encrypted part of a file within the same infected file. However, viruses such as the Win32/Magistr.B virus, for example, do not store the encryption key in the file, but instead use, for example, the "computer name" which it retrieves from the system itself as the encryption key. This counts on the computer name not changing, so that it is constant for the given machine, and can be safely used to decrypt data in files infected on that machine.

The problem is that when antivirus systems need to cure (and therefore decrypt parts) of such an infected file, it also needs to access the computer name of the machine the file was infected on to get the key and be able to decrypt encrypted parts of data so that they can be restored. However, retrieving the key and using it is very unsafe and is not always possible because when antivirus systems scan files on a network, for example, the antivirus system program itself may be located on a different machine (e.g., the network server), and not on the infected work station machine itself. Accordingly, the antivirus system cannot always reliably retrieve the computer name of the infected machine.

Another problem is that when an infected file is moved out of the machine it was infected on (e.g., sent to an antivirus team for analysis, or the computer name was changed by user on the infected machine) it may not be possible to determine the original computer name.

SUMMARY OF THE DISCLOSURE

A method, system and computer code is disclosed for curing an encrypted computer virus present in a computer system and includes analyzing encrypted data to determine at least one most frequently occurring encrypted byte in the encrypted data, calculating an encryption key based on the most frequently occurring encrypted byte and a corresponding expected original byte of original data and decrypting the encrypted data using the encryption key to restore the encrypted data to original data.

A method of detecting and curing a computer virus present in a computer system includes scanning the computer system for a computer virus, determining whether encrypted data is to be decrypted in order to cure the computer virus detected in the computer system, analyzing the encrypted data to determine at least one most frequently occurring encrypted byte in the encrypted data, when it is determined that the encrypted data is to be decrypted, confirming that the most frequently occurring encrypted byte is a dominant encrypted byte where the dominant encrypted byte is statistically dominant among other bytes of the encrypted data, calculating an encryption key based on the dominant encrypted byte and a corresponding expected original byte of original data and decrypting the encrypted data using the encryption key to restore the encrypted data to original data present in the computer system prior to encryption by the computer virus.

A system for detecting and curing a computer virus in a computer system included a scanning device adapted to scan the computer system for a computer virus, a decryption control device adapted to determine whether decryption of encrypted data in the computer system is to be performed after the computer virus is detected, an encrypted byte processing device adapted to analyze the encrypted data to determine at least one most frequently occurring encrypted byte in the encrypted data when it is determined that the encrypted data is to be decrypted, a dominant byte controller adapted to determine whether the most frequently occurring encrypted byte is a dominant encrypted byte, where a dominant encrypted byte is statistically dominant in the encrypted data, an encryption key calculating device adapted to calculate an encryption key based on the dominant encrypted byte and a correspondingly expected original byte of original data and a decrypting device adapted to decrypt each byte of encrypted data based on the encryption key to restore the encrypted data to original data present in the computer system prior to encryption by the computer virus.

A program storage medium, readable by a computer system, embodying a program of instructions executable by the computer system to conduct a lottery, includes method steps including scanning the computer system for a computer virus, determining whether encrypted data is to be decrypted in order to cure the computer virus detected in the computer system, analyzing the encrypted data to determine at least one most frequently occurring encrypted byte in the encrypted data, when it is determined that the encrypted data is to be decrypted, confirming that the most frequently occurring encrypted byte is a dominant encrypted byte where the dominant encrypted byte is statistically dominant among other bytes of the encrypted data, calculating an encryption key based on the dominant encrypted byte and a corresponding expected original byte of original data and decrypting the encrypted data using the encryption key to restore the encrypted data to original data present in the computer system prior to encryption by the computer virus.

A method of decrypting encrypted data in a computer system infected by a computer virus includes determining whether the encrypted data is to be decrypted, analyzing the encrypted data to determine at least one most frequently occurring encrypted byte in the encrypted data, when it is determined that the encrypted data is to be decrypted, confirming that the most frequently occurring encrypted byte is a dominant encrypted byte, where the dominant encrypted byte is statistically dominant among other bytes of the encrypted data, calculating an encryption key based on the dominant encrypted byte, a corresponding expected original byte of original data and a known relationship there between and decrypting the encrypted data using the encryption key to restore the encrypted data to original data present in the computer system prior to encryption.

BRIEF DESCRIPTION OF THE DRAWINGS

A more complete appreciation of the present disclosure and many of the attendant advantages thereof will be readily obtained as the same becomes better understood by reference to the following detailed description when considered in connection with the accompanying drawings, wherein.

DETAILED DESCRIPTION

Figure 1:
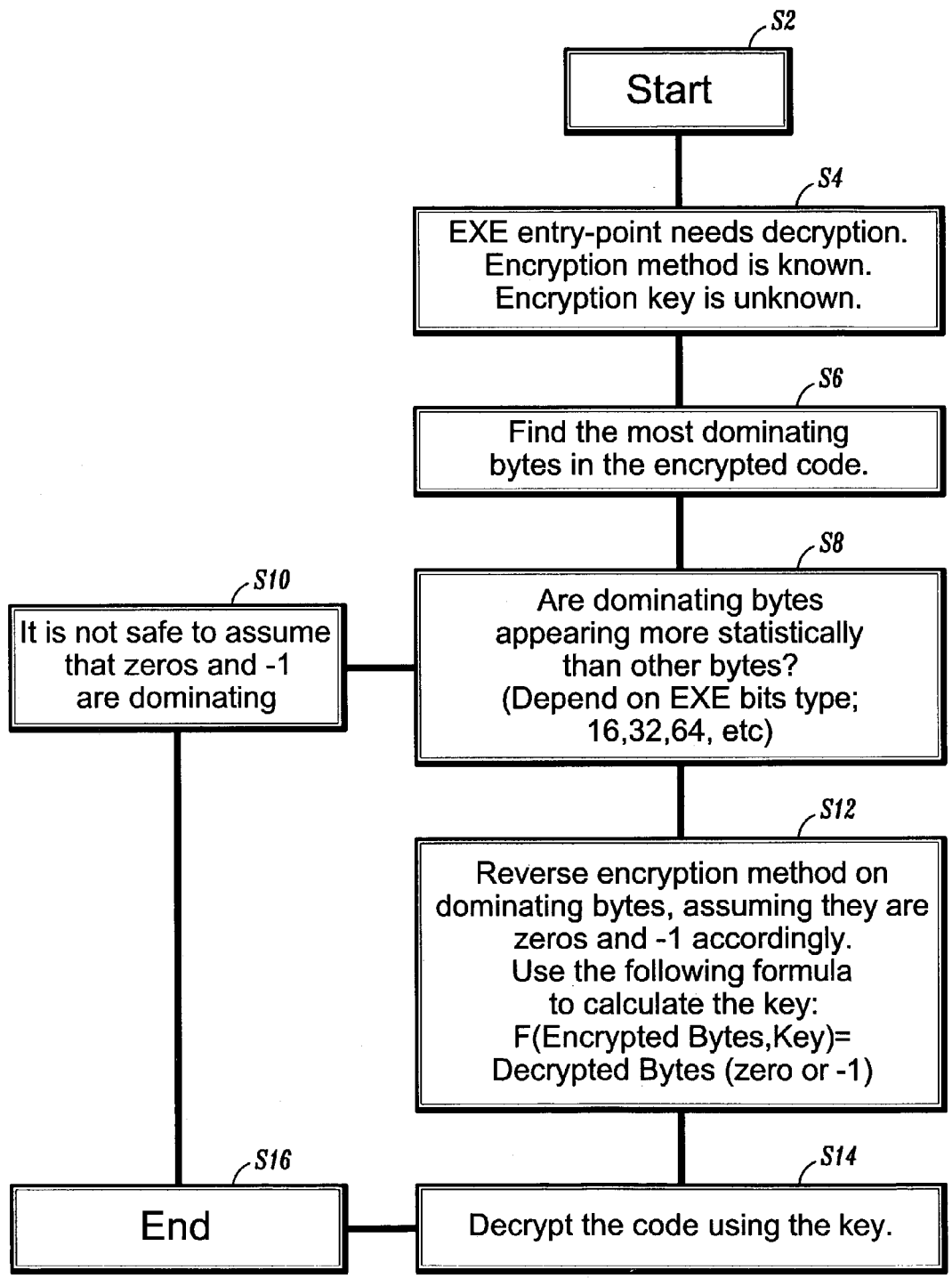
FIG. 1 is a flow chart of a system for curing a virus according to an embodiment of the present disclosure.

In describing preferred embodiments of the present disclosure illustrated in the drawings, specific terminology is employed for sake of clarity. However, the present disclosure is not intended to be limited to the specific terminology so selected and it is to be understood that each specific element includes all technical equivalents which operate in a similar manner.

The present system is capable of scanning for and detecting viruses, and includes mechanisms or cure processes to cure infections it finds in files, memory, disk boot sectors, other objects, etc.

The system preferably scans a file, memory, disk boot sector, etc. of a computer system for a virus. Various methods of scanning may be used to detect the presence of the virus in a file, for example. The system may utilize signature scanning, in which the system scans for the presence of a virus signature, a unique set of hexadecimal code which a virus leaves in an infected file. Heuristic scanning may be utilized to detect unknown viruses, that is, viruses for which the virus signature is not yet known. Heuristic scanning relates to an artificial intelligence technique used to detect virus-like patterns of behavior. Integrity checking may be used to determine whether the size of a file has increased due to the presence of a virus in the file. In addition, the system may monitor certain actions of program, such as call functions, to detect suspicious program behavior. In addition the system may monitor program system calls to detect and stop system calls which indicate the presence of a virus. While several scanning and detecting techniques are discussed above, the present disclosure is not limited to the use of those techniques, but is intended to include any technique for the detection of viruses.

Once the virus has been detected, a primary concern is to eliminate the virus and to cure any damage done by the virus. The purpose of a cure process is to try to restore the object such as the file, memory or disk boot sector, etc. to as close as possible to its initial state before infection, thus effectively disinfecting the object detected as being infected.

The cure process is run after the virus is identified or detected by the system and the user asks the antivirus system to cure the infected object either as a response to an alert from the antivirus system, or by giving instructions to the antivirus system to cure all found infected objects automatically without prompting. Generally, this option is selected in advance by a user, or a system administrator.

The cure process consists of a set of instructions, that may be executed sequentially. These instructions can perform various changes to the file, such as copying blocks of data from place to place in a file, or copying decrypted data from internal buffers to various places in a file (e.g., in a case in which a virus has encrypted some data that is crucial to the cure process), or cutting pieces of a file that contain viral code, etc.

The cure process instructions may be implemented as a set of fast-executing functions written in C that help the cure process instructions to complete complex cure processes.

As noted above, viruses may be detected based on the virus signature. In this case, it is also possible to easily identify which specific virus has been detected since the virus signature is unique to each virus. The cure process is then somewhat simplified since the identity of the virus is known, and thus the type of damage which that virus inflicts is known. Otherwise, it may be necessary to analyze the virus in order to determine what kind of damage the virus may cause.

Viruses often encrypt parts of the virus body and parts of the infected file in order to complicate virus detection and curing, as noted above. For example, the Win32/Magistr.B-.Worm encrypts the entry point code of the infected file, thus complicating removal of the virus from the infected file and curing of any damage done to the file by the virus. The Win32/Magistr.B.Worm virus further complicates removal and curing in that it does not store the encryption key in the infected file where it can be retrieved by the system, but instead uses the computer name to generate an encryption key. This poses a problem where the virus detection and curing system program is run on a server or computer other than the infected computer system or when the virus is to be sent for analysis by an antivirus team, for example. In both of these cases, the computer name of the infected computer may not be available to the virus detecting and curing system.

While the above-noted problems look impossible to solve because the antivirus system is presented with unknown data encrypted by an unknown key, the present system is capable of determining, the key using a probabilistic algorithm that works with very high percentage of success. The present system is capable of determining the encryption key when it is unknown, based on a probability of occurrence of some bytes in assembled original code.

The algorithm is based on knowledge of the fact that certain systems may include bytes having a certain form or forms which can be determined and used to determine a key used by a virus. For example, a 32-bit executable code for Intel processors contains a lot of "zeros" (bytes of value zero), and bytes of value 255. For example, the percentage of these kinds of bytes can be very high and may even be over 60% of all the bytes. In addition, bytes of value zero often come in pairs, which can also aid the present system and method by allowing those bytes to be more readily detected. It is noted that for other processors, bytes with a different value may be the most commonly occurring byte depending on the type of object infected by the virus and this invention is not limited to use with any specific processor or object.

The present system and method may use a system referred to herein as probabilistic encryption key guessing. An encryption method that is often used by viruses is to perform a logical XOR operation of each byte of data with a constant key. Accordingly, using this knowledge the bytes that contained zeros before encryption will contain values of the key used after encryption.

Since zeros were the most frequently seen values in the original data, in the encrypted data the most frequently seen value in the encrypted data will be the value of the key the antivirus system is looking for. The probability that this will be true is the same as the probability of zeros being the most frequently used in original data, which is very high. In effect, in the present system, therefore, probabilistic key guessing is used to identify bytes of original data. As a result, known encryption data can be compared to "known", or at least expected bytes of the original data, where the encryption method (the logical XOR operation of the original data with the unknown encryption key) is also known. Thus, the encryption key can be determined and once determined can be applied to the remaining encrypted data based on the known encryption method to restore the original data.

The present system can thus count the number of occurrences of each byte in the encrypted data and choose the most frequently used one. In this example, this will be the key.

More specifically, by analyzing an EXE entry point code, it becomes clear that there are more 00 (zero) and FF (−1) bytes in the code than other bytes, particularly in EXE32-bits and higher, since numbers are aligned to the number of bits used and small numbers are padded with zeros (for positive numbers) and −1 (for negative numbers).

If the method used for encryption is known, the system can calculate the encrypted value of zero and −1 bytes, then find those values and by that calculate a key that was used for the encryption.

For example, if the key value is 2 and the method for encryption is adding the key value to every byte in the code, it means that every byte that was zero is now 2 (since 0+2=2) and every byte that was −1 is now 1 (since −1+2=1) It is highly likely that in such encryption, that there will be more ones and twos than other bytes. Finding the key is then relatively easy. Ones and twos are dominating, it is clear that the key is 2, since 1−X=−1 and 2−X=0, X=2. The key is thus found.

As shown in FIG. 1, after start (step S2), it is determined that EXE entry-point needs decryption. In this example, the encryption method is known, and the encryption key is unknown (Step S4) In step S6, the most dominating bytes in the encrypted code are found. A determination is then made whether dominating bytes are statistically appearing more often than other bytes (depending on EXE bits type: 16, 32, 64, etc)(Step S8). If it is determined statistically that it is not safe to assume that certain bytes are dominating (Step S10), the process ends (Step S16). Fit is safe to assume that certain bytes are dominating, a reverse encryption method on dominating bytes, assuming they were originally zeros and −1, is accordingly performed (Step S12) as described above and the key is determined. For example, to determine the key the following formula F(Encryption Bytes, Key)=Decrypted Bytes (zero, −1) may be used. The code is then decrypted using the key (step S14) and the process ends (Step 16).

Although, explained above by assuming that an XOR operation is performed by the encrypting method, the present system and method is not limited thereto. That is, the present system and method may be used for any type of virus in which the encryption method can be determined and decryption can be performed. For example, various types of encryption may be assumed and the present system used to determine the valid decryption key for each type of encryption, until the correct encryption type and corresponding key are found. In addition, although described above with respect to a 32-bit executable code in which bytes of zero and/or bytes of 255 may dominate, the present system can be implemented for any type of executable code in which it is known or for which it can be determined that a sufficient percentage of bytes are known to be a particular known value or values.

The now chart of FIG. 1 describes a method used for curing a virus utilized in a specific case where it is known that original data of the file, memory, disk boot sector etc. is known to be dominated by bytes a value of zero and −1. The present method and system, however are not limited to such a situation.

Figure 2:
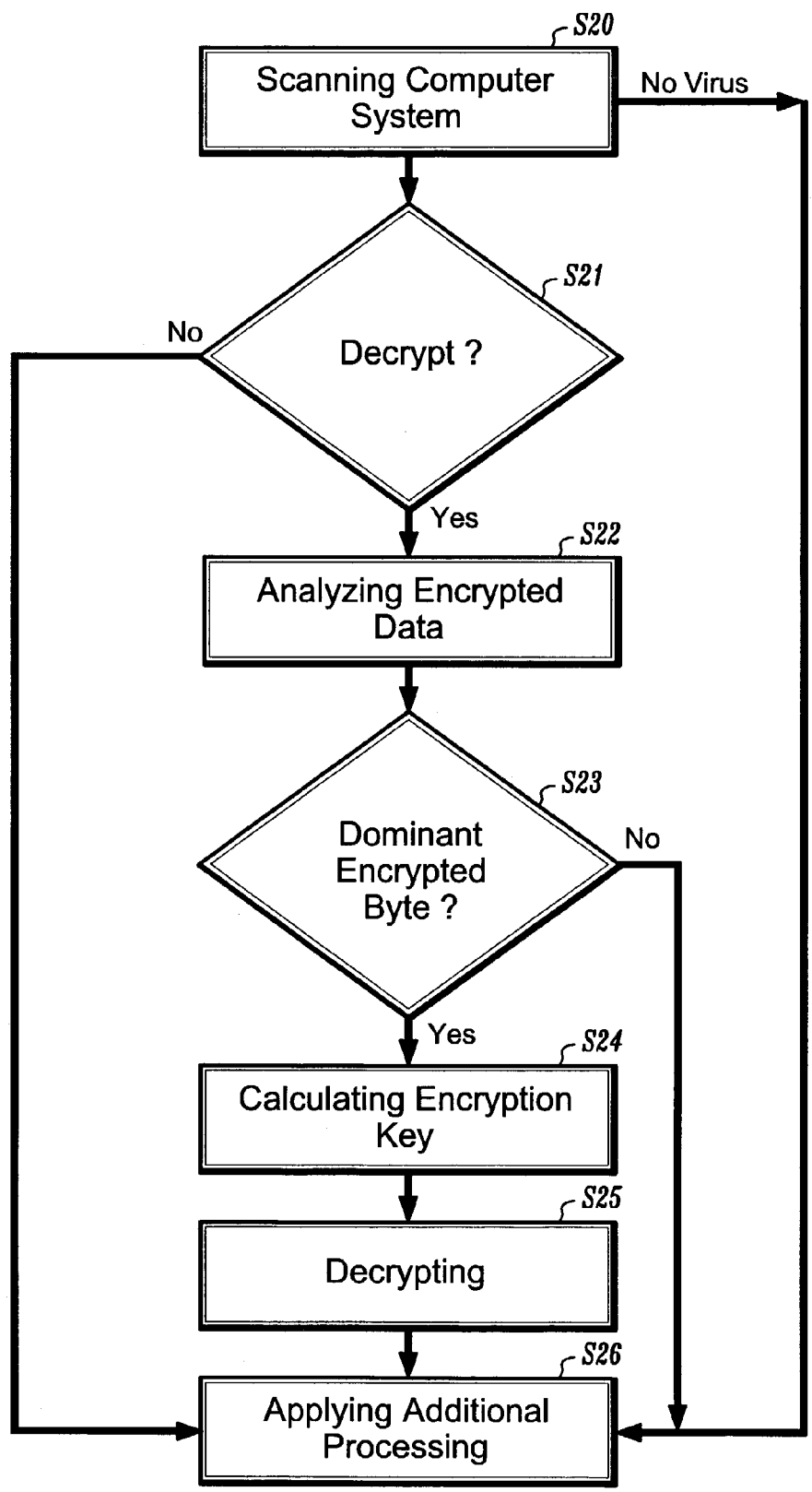
FIG. 2 is a flow chart of a method of detecting and curing a computer virus according to an embodiment of the present disclosure.

FIG. 2 illustrates a more general method of detecting and curing a virus in accordance with the present disclosure. At step S20, a computer system is scanned for the presence of a computer virus. In step S21, it is determined that encrypted data is to be decrypted after a virus is detected. If data need not be decrypted (No at step S21) further processing may be performed (Step S26). Otherwise, in step S22, the most frequently occurring encrypted byte or bytes in the encrypted data are determined. At step S23, it is determined whether the most frequently occurring encrypted byte or bytes are dominant encrypted bytes where dominant encrypted bytes are statistically dominant among the encrypted data. If no dominant encrypted byte or bytes are determined, further processing may be performed (Step S26). An encryption key is calculated based on the dominant encrypted byte or bytes and a corresponding expected original byte or bytes of original data (Step S24). The encryption key is then used to decrypt each byte of encrypted data utilizing the known relationship and the encryption key to restore the encrypted data to original data (Step S25). The restored original data may then be used for further processing (Step S26).

In the scanning, step, step S20, any of the scanning methods described above may be utilized to detect the presence of a virus in the file, memory, disk boot sector of the computer system. If no virus is detected in the scanning step, additional processing may be applied (Step S26).

In the determining step S21, a determination is made as to whether encrypted data is to be decrypted. For example, if a virus is detected in step S20, but the virus is a known virus which may not require decryption to cure, decryption of encrypted data may not be necessary. If no decryption is necessary (No at step S21) further processing maybe performed (step S26) This further processing will be further discussed below. If decryption of encrypted data is desired (Yes at step S21), the encrypted data is analyzed at step S22.

In step S22, the encrypted data is analyzed to identify a most frequently occurring byte or bytes of encrypted data. Most simply, this is accomplished by counting the occurrence of each byte of encrypted data. That is, each occurrence of a specific byte in the encrypted data is counted. The most frequently occurring byte or bytes of encrypted data are then determined.

In step 23, at determination is made as to whether the most frequently occurring encrypted byte or bytes are c dominant encrypted bytes. That is, based on the counting of each byte of encrypted data, for example, it is determined whether the most frequently occurring encrypted byte or bytes define a sufficient percentage of the encrypted data to statistically dominate the encrypted data. If no dominant encrypted byte or bytes are found (No at step S23), further processing may be performed (step S26). In such a situation, probabilistic encryption key guessing may not provide a reliable encryption key because no dominant encrypted byte or bytes have been found. Where a dominant encrypted byte or bytes are found (Yes at step S23), the dominant encrypted byte or bytes may be compared to a corresponding expected original byte or bytes of original data (step S24).

In step S24, the encryption key is calculated based on a known relationship between the dominant encrypted byte or bytes and a corresponding expected original byte or bytes of original data. The known relationship may be the encryption method utilized by the virus. The dominant encrypted byte or bytes are compared to a corresponding expected original byte or bytes of original data. Original data generally refers to data present in the file, memory, disk boot sector, etc. prior to encryption by the computer virus. For example, in the method described in FIG. 1, it is determined that 1 and 2 are the dominant encrypted bytes. Since zeros and −1's are expected to be the most dominant bytes of original data, 0 and 1 are the corresponding expected original bytes. As noted above, different bytes may be expected to occur most frequently in the original data depending on the situation. The encryption method used by many viruses is a logical XOR operation of each byte of original data with the encryption key, which remains constant. Thus, the expected original byte+the encryption key=the dominant encrypted byte of encrypted data. Where there is more than one dominant encrypted byte, there will be more than one corresponding expected original byte, however, the encryption key remains constant, such that the encryption key is the value that makes the above equation true for each dominant encrypted byte of data and each corresponding expected original byte of original data. For example, as described above with reference to FIG. 1. The dominant encrypted bytes are 1 and 2. The corresponding expected original bytes are expected to be −1 and zero, respectively. The encryption key is the value that makes both of the following equations true: −1+X=1 and 0+X=2. Thus, the encryption key is 2, as noted above. It is noted that where the corresponding expected original byte is zero, this calculation step is particularly simple since the encryption key will be the dominant encrypted byte. Once the encryption key is calculated, the encrypted data can be decrypted (Step S26).

In step S25, since the encryption key is now known and the encryption method was already known, the encrypted data can be decrypted by simply reversing the encryption method and applying the encrypted data and the encryption key to restore the original data. The restored original data may then be utilized in further processing (Step 26).

Further processing (step S26) may refer to any other processing necessary for the detection and curing of viruses. For example, where no virus is detected in the scanning step (S20), the further processing may refer to scanning another file, memory or disk boot sector. Alternatively, the further processing may refer to beginning the process again using a different scanning method. If there is no need to decrypt data (No in step S21), the further processing may be any cure processing mentioned above, such as copying sections of data, removing sections of data, etc. Where no dominant encrypted byte is present in the encrypted data (No at step S23), the additional processing may refer to application of some other decryption system such as a brute force method without benefit of the probabilistic encryption key guessing of the present system. Where additional processing is desired alter the encrypted data is decrypted to restore the original data in step S25, the further processing may also refer to other cure processing, such as analyzing the virus or removing the virus from the file, memory, disk boot sector, etc performed on the restored original data. While specific additional processing steps have been discussed above, it should be understood that the present disclosure is not limited thereto and the additional processing may refer to any processing for the detection and curing of computer viruses.

Figure 3:
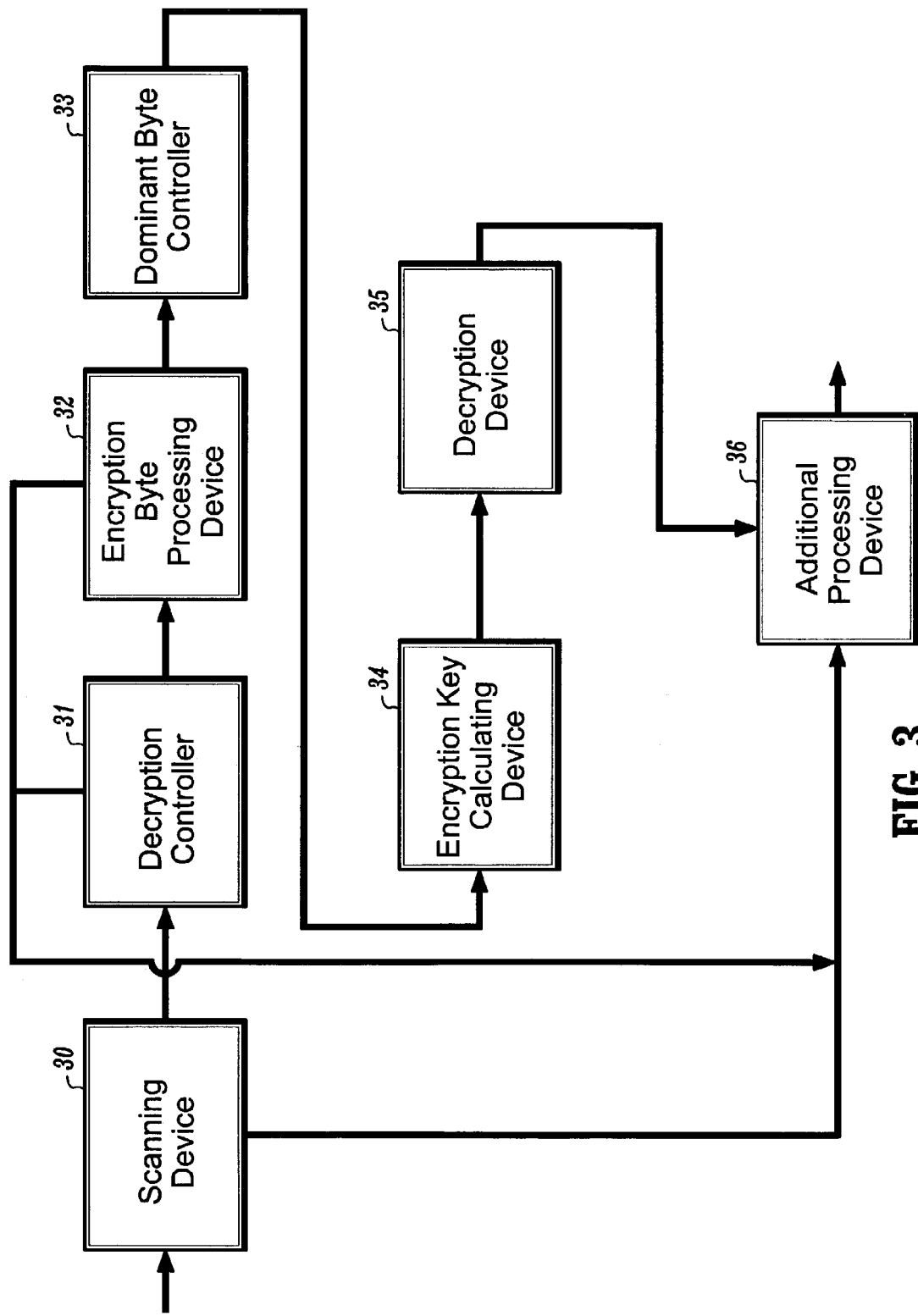
FIG. 3 is a block diagram illustrating a system for detecting and curing a computer virus according to an embodiment of the present disclosure.

The method described herein may be implemented by a system for detecting and curing computer viruses. A system for detecting and curing computer viruses is described further with reference to FIG. 3.

A scanning, device 30 is provided for scanning a file, memory, boot sector, etc. for the presence of a computer virus, or other malicious code. The scanning device may implement any or all of the scanning methods mentioned herein above, or any other desired scanning method. If no virus is detected, the additional processing device 36 may apply additional processing for detecting and curing a computer virus. The additional processing device 36 is described in further detail herein below.

A decryption control device 31 determines whether encrypted data detected in the file, memory, disk boot sector, etc. should be decrypted, for example, if a computer virus is detected by the scanning, device 30, but decryption is not required to cure the computer virus. If decryption is not required, the additional processing device 36 may be directed to provide additional processing for the data in the file, memory, disk boot sector, etc. If decryption is necessary, the encrypted data is analyzed by an encrypted byte processing device 32.

Encrypted byte processing device 32 analyzes the encrypted data to determine a most frequently occurring encrypted byte or bytes in the encrypted data. Most simply, the encrypted byte processing device 32 merely adds up each occurrence of each specific byte of encrypted data. The specific byte or bytes of encrypted data which occur most frequently are the most frequently occurring encrypted byte or bytes in the encrypted data.

A dominant byte controller 33 confirms whether the most frequently occurring encrypted byte or bytes in the encrypted data are dominant encrypted bytes. That is, the dominant byte controller 33 determines whether the most frequently occurring encrypted byte or bytes provided by the encrypted byte processing device 32 are statistically dominant in the encrypted data. If this is the case, the dominant encrypted byte or bytes may be compared to a corresponding expected original byte or bytes of original data in the encryption key calculating device 34. If the dominant encrypted byte or bytes are not statistically dominant, probabilistic encryption key guessing may not provide an encryption key. The encrypted data may then be subjected to additional processing in the additional processing device 36.

The encryption key calculating device 34 calculates the encryption key based on a known relationship between the most dominant encrypted byte or bytes of encrypted data and the corresponding expected original byte or bytes of original data. The known relationship may be the method of encryption used by the virus. As noted above, viruses often use a logical XOR operation of each byte of original data with the encryption key to yield the encrypted data. Thus, the expected original byte or bytes+the encryption key=the dominant encrypted byte or bytes. Using this known relationship, the encryption key calculating device 34 determines the encryption key, since the corresponding expected original byte or bytes of original data are known and the dominant encrypted byte or bytes encrypted data are known. As described above, the relationship is equally as useful in determining the encryption key where there is more than the one dominant encrypted byte and thus more than one corresponding expected original byte of data. In this case, the encryption key is simply the value that makes the relationship true for each dominant encrypted byte or bytes of encrypted data and its corresponding expected original byte.

Once the encryption key is calculated, the decryption device 35 decrypts the encrypted data to restore original data present in the file, memory, disk boot sector, etc. prior to infection by the computer virus. The decryption is accomplished using the encryption key and the known relationship. More specifically, the encryption key is utilized in a decryption method that is the opposite of the encryption method, represented by the known relationship. In this manner, each encrypted byte of data may be restored to original data which existed prior to encryption by the computer virus. The restored original data may be subjected to further processing by the additional processing device 36.

The additional processing device 36 provides a wide range of processing options. For example, where no virus has been detected by the scanning device 30, further processing may include scanning another file, section of memory or disk boot sector. In a situation where a virus is discovered, but decryption of encrypted data is not necessary as determined by the decryption controller 31, the additional processing will typically consists of any of the cure processes mentioned above, such as, copying or cutting data for example, from the infected file. Where no dominant encrypted byte or bytes of encrypted data are found by the dominant byte controller 33, that is, when the most frequently occurring encrypted byte or bytes in the encrypted data are not statistically dominant in the encrypted data, the additional processing may include any other decryption method. More specifically, the additional processing may include another method of determining the encryption key so that the encrypted data can be decrypted. After the encrypted data is decrypted by the decrypting device 35, the restored original data may be subjected to additional processing, such as analysis of the virus to learn about its operation or any other cure processing. While these specific additional processing techniques have been mentioned, the present disclosure is not limited thereto, and additional processing may apply to any processing which aids in the detection and curing of the computer virus.

Figure 4:
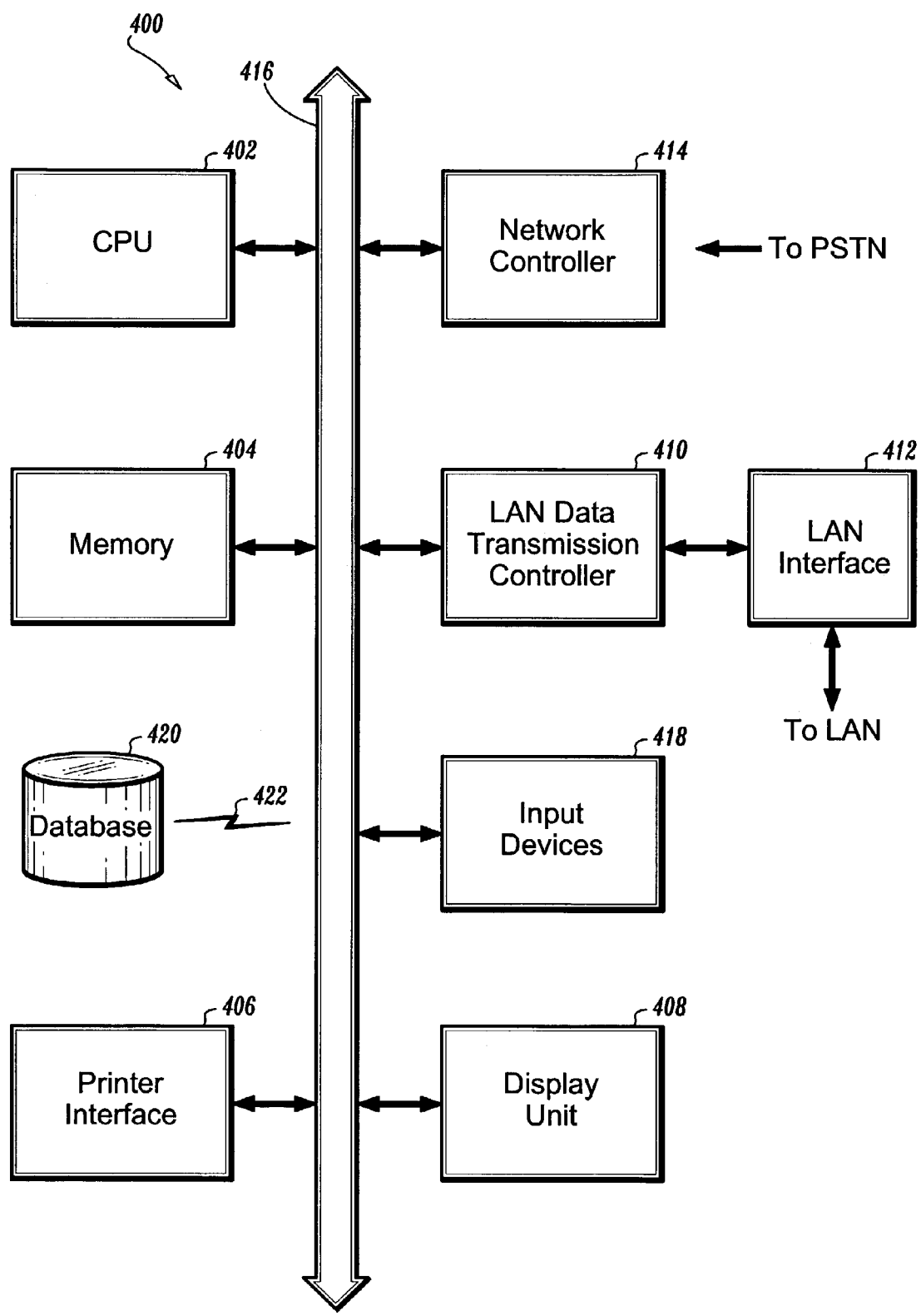
FIG. 4 is a block diagram of a computer system capable of implementing the method and system for detecting and curing a computer virus according to an embodiment of the present disclosure.

The above described method and system may be implemented on a general purpose digital computer, personal computer (PC) or network server, for example. An example of a computer system capable of implementing the present system and method is shown in FIG. 4. The computer system referred to generally as system 400 may include a central processing unit (CPU) 402, memory 404, a printer interface 406, a display unit 408, a LAN (local area network) data transmission controller 410, a LAN interface 412, network controller 414, an internal bus 416, a database 420 with a link thereto 422 and one or more input devices 418 such as, for example, a keyboard, mouse, etc. Naturally, other components maybe included in the computer system 400 and some components may not be present. System 400 also represents one example of a computer system to which the system and method for detecting and curing a computer virus may be applied to detect and cure any computer viruses present in the system 400.

As noted above, antivirus systems are commonly implemented on a machine other than the machine which is being checked for computer viruses. For example, a network server may run an antivirus program to check for the presence of viruses on all of the work stations of a network. Alternatively, each workstation on a network may independently run the antivirus system on a localized basis. The method and system of the present disclosure may also be implemented on an e-mail server, for example, to detect and cure viruses present in e-mail messages to avoid infection of the network or individual work stations on the network. The present disclosure is intended to be applicable in all of these situations.

Figure 5:
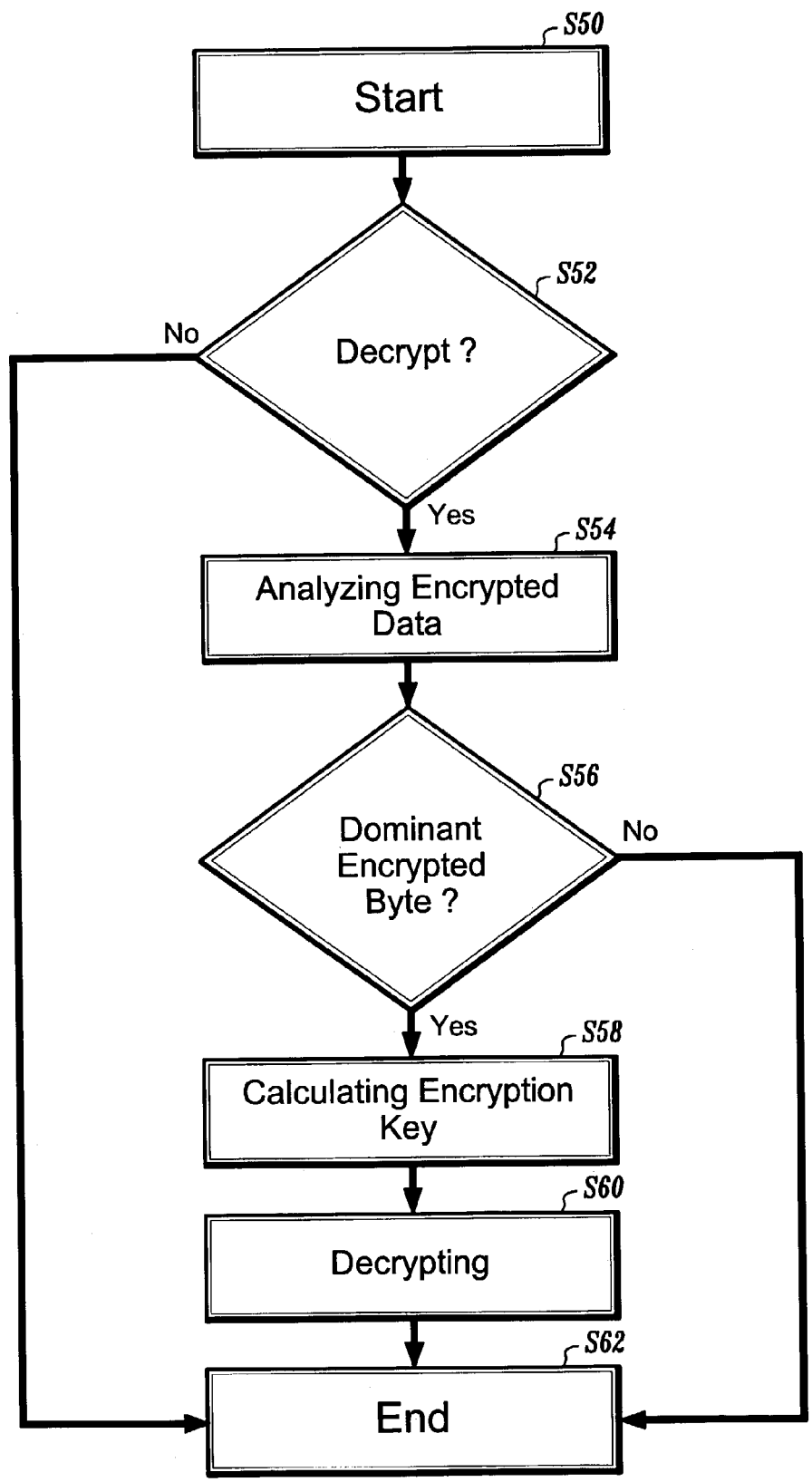
FIG. 5 is a flow chart of a method of decrypting encrypted data in a computer system according to all embodiment of the present invention.

It is noted that the probabilistic key guessing method used to decrypt encrypted data described herein may be used in many currently existing antivirus systems to augment the cure processing available or may be implemented in an independent antivirus system as described herein. FIG. 5 illustrates a method of decrypting encrypted data in a computer system according to an embodiment of the present disclosure. After starting the method (Step S50), it is determined whether decryption of encrypted data is desired (Step S52). At step 54, the encrypted data is analyzed to determine a most frequently occurring encrypted byte or byte of the encrypted data. At step 56, is confirmed that the most frequently occurring encrypted byte or bytes represent a dominant encrypted byte or bytes. At step 58, an encryption key is calculated based on the dominant encrypted byte or bytes and a corresponding expected original byte or bytes of original data. At step 60, the encrypted data is decrypted based on the encryption key.

If decryption is not desired (No at step S52), the method may end (Step S62). If the most frequently occurring encrypted byte or bytes are not a dominant encrypted byte or bytes, the method may end (Step S62) In this case, probabilistic key guessing may not provide a reliable encryption key and thus may not be used to decrypt the encrypted data. Note that despite use of the term "end" in step S62, this does not necessarily indicate that no further processing will take place on the encrypted data, but rather simply indicates that the method of decrypting data in accordance with the method shown in FIG. 5 is not desirable for decrypting data encrypted by the computer virus in this case.

Steps 50-62 represent a more general implementation of the method described in detail with respect to FIG. 1 and are substantially similar to steps 31-37 described in detail above and thus will not be discussed here in any further detail.

The present disclosure may be conveniently implemented using one or more conventional general purpose digital computers and/or servers programmed according to the teachings of the present specification. Appropriate software coding can readily be prepared by skilled programmers based on the teaching is of the present disclosure. The present disclosure may also be implemented by the preparation of application specific integrated circuits or by interconnecting an appropriate network of conventional components.

Numerous additional modifications and variations of the present disclosure are possible in view of the above-teachings. It is therefore to be understood that within the scope of the appended claims, the present invention may be practiced other than as specifically described therein.

What is claimed is:

1. A method of detecting and curing a computer virus present in a computer system comprising:
    scanning the computer system for a computer virus:
    determining whether encrypted data is to be decrypted in order to cure the computer virus detected in the computer system;
    analyzing the encrypted data to determine at least one most frequently occurring encrypted byte in the encrypted data, when it is determined that the encrypted data is to be decrypted;
    confirming that the most frequently occurring encrypted byte is a dominant encrypted byte where the dominant encrypted byte is statistically dominant among other bytes of the encrypted data;
    calculating an encryption key based on the dominant encrypted byte and a corresponding expected original byte of original data; and
    decrypting the encrypted data using the encryption key to restore the encrypted data to original data present in the computer system prior to encryption by the computer virus.

2. The method of claim 1 further comprising applying additional processing for detecting and curing the computer virus in the computer system.

3. The method of claim 2, wherein the step of applying additional processing applies additional processing to the restored original data.

4. The method of claim 2, wherein the step of applying additional processing is applied when the scanning step fails to detect the computer virus.

5. The method of claim 2, wherein the step of applying additional processing is applied when the determining step determines that decrypting encrypted data is not to be performed.

6. The method of claim 2, wherein the step of applying additional processing is applied when the confirming step indicates that the most frequently occurring encrypted byte is not a dominant encrypted byte.

7. The method of claim 1, wherein the corresponding expected original byte is a byte of original data which is expected to occur most frequently in the original data.

8. The method of claim 7, wherein the encryption key is determined based on a known relationship between the dominant encrypted byte and the corresponding expected original byte where the known relationship is defined by an encryption method utilized by the computer virus.

9. The method of claim 8, wherein the step of decrypting is performed by applying the encryption key and the encrypted data to a decryption method opposite that of the encryption method.

10. A system for detecting and curing a computer virus in a computer system comprising:
    a scanning device adapted to scan the computer system for a computer virus;
    a decryption control device adapted to determine whether decryption of encrypted data in the computer system is to be performed after the computer virus is detected;
    an encrypted byte processing device adapted to analyze the encrypted data to determine at least one most frequently occurring encrypted byte in the encrypted data when it is determined that the encrypted data is to be decrypted;
    a dominant byte controller adapted to determine whether the most frequently occurring encrypted byte is a dominant encrypted byte, where a dominant encrypted byte is statistically dominant in the encrypted data;
    an encryption key calculating device adapted to calculating an encryption key based on the dominant encrypted byte and a corresponding expected original byte of original data; and
    a decrypting device adapted to decrypt each byte of encrypted data based on the encryption key to restore the encrypted data to original data present in the computer system prior to encryption by the computer virus.

11. The system of claim 10 further comprising an additional processing device adapted to perform additional processing for detecting and curing the computer virus.

12. The system of claim 11, wherein the additional processing device performs the additional processing on the restored original data.

13. The system of claim 11, wherein the additional processing device performs the additional processing when the computer virus is not detected by the scanning device.

14. The system of claim 11, wherein the additional processing device performs the additional processing when the decryption control device indicates decryption of the encrypted data is not to be performed.

15. The system of claim 10, wherein the additional processing device performs additional processing when the dominant byte controller determines that the most frequently occurring encrypted byte is not the dominant encrypted byte.

16. The system of claim 10, wherein the corresponding expected original byte is a byte of original data expected to occur most frequently in original data present in the computer system prior to encryption by the computer virus.

17. The system of claim 10, wherein the encrypted byte analyzing device counts the occurrence of each byte of encrypted data to determine the at least one most frequently occurring encrypted byte in the encrypted data.

18. The system of claim 10, wherein the encryption key calculating device compares the dominant encrypted byte to the corresponding expected original byte according to a known relationship and calculates the encryption key using the known relationship.

19. The system of claim 18, wherein the known relationship is based on the encryption method used by the computer virus to encrypt data.

20. The system of claim 10, wherein the decrypting device decrypts each byte of encrypted data to restore the original data based on the encryption key, and a decryption method which is opposite the encryption method used by the computer virus to encrypt data.

21. A program storage medium, readable by a computer system, embodying computer executable code, comprising:

code for scanning the computer system for a computer virus;

code for determining whether encrypted data is to be decrypted in order to cure the computer virus detected in the computer system;

code for analyzing the encrypted data to determine at least one most frequently occurring encrypted byte in the encrypted data, when it is determined that the encrypted data is to be decrypted;

code for confirming that the most frequently occurring encrypted byte is a dominant encrypted byte where the dominant encrypted byte is statistically dominant among other bytes of the encrypted data;

code for calculating an encryption key based on the dominant encrypted byte and a corresponding expected original byte of original data; and code for decrypting the encrypted data using the encryption key to restore the encrypted data to original data present in the computer system prior to encryption by the computer virus.

\* \* \* \* \*